Patented May 1, 1934

1,957,268

UNITED STATES PATENT OFFICE 1,957,268

MANUFACTURE OF SULPHATE OF AMMONIA

Georg Hiller, Essen-Ruhr, Germany, assignor, by mesne assignments, to The Koppers Company of Delaware, Pittsburgh, Pa., a corporation of Delaware No Drawing. Application December 14, 1931, Serial No. 581,074. In Germany December 13, 1930

4 Claims. (Cl. 23—119)

(Granted under the provisions of sec. 14, act of March 2, 1927; 357 O. G. 5)

The invention relates to the manufacture of sulphate of ammonia from sulphuric acid and ammonia and more particularly to the manufacture of sulphate of ammonia from sulphuric acid and synthetic ammonia, i. e. ammonia which preferably results from the combining of pure nitrogen and hydrogen.

In working up pure ammonia, for instance synthetic ammonia to sulphate of ammonia, the ammonia is preferably brought in gaseous form in contact with the sulphuric acid in vessels lined with lead, which are well known under the name of "saturators". The ammonia gas which comes from the plant serving to produce the synthetical product is now generally very highly concentrated. In consequence there results a very high ammonia concentration at the points, where the ammonia gas comes into contact with the sulphuric acid. This concentration can indeed be so high, that at the points, where the ammonia gases are led into the sulphuric acid, the liquid reacts alkali-like. The ammoniacal sulphate solutions attack, as is well known (see journal for "Electrochemie und Angewandte Physikalische Chemie", volume 24, pages 361–366) the lead to a very high degree.

In order to avoid this disadvantage, when making sulphate of ammonia from synthetical ammonia and sulphuric acid, one has tried or proposed to introduce into the acid bath, when the ammonia is being passed in either together with the gaseous ammonia or separately from same, a gas non-reacting with sulphuric acid for the purpose of diluting the ammonia. In the inert gas, which is passed into the acid bath together with the ammonia, the saturator liquid is strongly agitated and in this way the formation of alkali fluid zones around the places, where the ammonia is passed in, is avoided.

In practising the above process, I have, however, found that corrosions of the metal lining and of the metal fittings of the saturators occur, although the fluid in the saturator has not at any point showed an alkaline reaction. Similar corrosions of the saturator lining have also been noticed, when concentrated synthetically produced ammonia gas is passed into sulphuric acid, which is agitated by a mechanical stirrer or the like in the presence of air or other oxygen containing gases.

It is noticeable that in case of saturators in which sulphuric acid is treated with the ammonia recovered from coal distillation gases, such corrosions do not take place.

The object of my invention is to provide improvements in the manufacture of sulphate of ammonia from synthetic ammonia and sulphuric acid, whereby corrosions of the lead lining of the sulphuric acid containers (saturators) and of the other metal fittings of same are avoided.

I have found that the corrosions on the lead lining and on the other metal fittings in customary saturators, when ammonium sulphate is made from synthetically produced ammonia and sulphuric acid are effected by small quantities of nitric acid contained in the sulphuric acid liquid. This sulphuric acid is formed by the oxidation of nitrogen oxides practically always present in customary sulphuric acid. Especially that kind of sulphuric acid which is made by the so-called lead chamber process, contains always a relatively large percentage of nitrogen oxides. These nitrogen oxides are oxidized to nitric acid by the oxygen of the air passed through or other gases containing oxygen in the saturator liquid or brought into intimate contact with same by the mechanical agitation.

In order to avoid this injurious oxidation of the nitrogen oxides in the saturator fluid, when making sulphate of ammonia from synthetically produced ammonia, there is, according to this invention, added to the saturator fluid reducing reagent in such quantities that an oxidation of the nitrogen oxide by the atmospheric oxygen to nitric acid cannot take place.

As reducing reagents, there can be used, in practising the process according to this invention, for instance sulphides, as ammonium sulphides, a salt or salts of sulphuric acid and especially ammonium sulphite or a salt or salts of the thiosulphurous acid.

Preferably for carrying out my process as indicated, I add to the saturator liquid a thiosulphate or a mixture of thiosulphate, especially ammonium thiosulphate. I use the thiosulphate for this purpose preferably in solid form, since in this way, it is possible to easily measure out the quantity of the material to be added.

The quantity in which the reducing reagent is put into the saturator, corresponds in every case to the particular quantity of nitrogen oxide, which is contained in the sulphuric acid, which is to be worked up. It is well to analyze the sulphuric acid for nitrogen oxides, so as to determine the content of nitrogen compounds before using the acid. The calculation of the quantity to be added of the reducing reagent is indicated, moreover, at once by the known conversions between the reducing reagents and the oxygen oxides. In each case, it is of advantage, however, to take 10% to 25% more of the reducing reagents than is really necessary for the production of the quantity of nitrogen oxides present in the sulphuric acid.

According to the invention, there is finally still during the introduction of the ammonia added to the liquid in the saturator continuously or intermittently a certain quantity of a reducing reagent. It may possibly happen, that the reducing reagent contained in the liquid in the saturator becomes used up so that during the running of the plant again corrosions occur. This shortage is remedied inasmuch as steps are taken, so that even after the introduction of the ammonia, either continuously or intermittently a reducing reagent is added.

I wish it to be understood that I do not desire to be limited to the exact details of the process herein described, for obvious modifications will occur to a person skilled in the art.

I claim:

1. In the process of manufacturing ammonium sulphate from sulphuric acid containing nitrogen oxides and ammonia diluted with air, the step of preventing corrosion of the reaction chamber which comprises adding ammonium thiosulphate to the sulphuric acid in amount sufficient to prevent the oxidation of the nitrogen oxides.

2. In the process of manufacturing ammonium sulphate from sulphuric acid containing nitrogen oxides and ammonia diluted with air, the step of preventing corrosion of the reaction chamber which comprises adding thiosulphate to the sulphuric acid in amount sufficient to prevent the oxidation of the nitrogen oxides.

3. In the process of manufacturing ammonium sulphate from sulphuric acid containing nitrogen oxides and ammonia diluted with air, the step of preventing corrosion of the reaction chamber which comprises adding a reducing agent for nitrogen oxides to the sulphuric acid in amount sufficient to prevent the oxidation of the nitrogen oxides.

4. In the process of manufacturing ammonium sulphate from sulphuric acid containing nitrogen oxides and ammonia diluted with air, the step of preventing corrosion of the reaction chamber which comprises adding ammonium thiosulphate in solid form to the sulphuric acid in amount sufficient to prevent the oxidation of the nitrogen oxides.

GEORG HILLER.